UNITED STATES PATENT OFFICE.

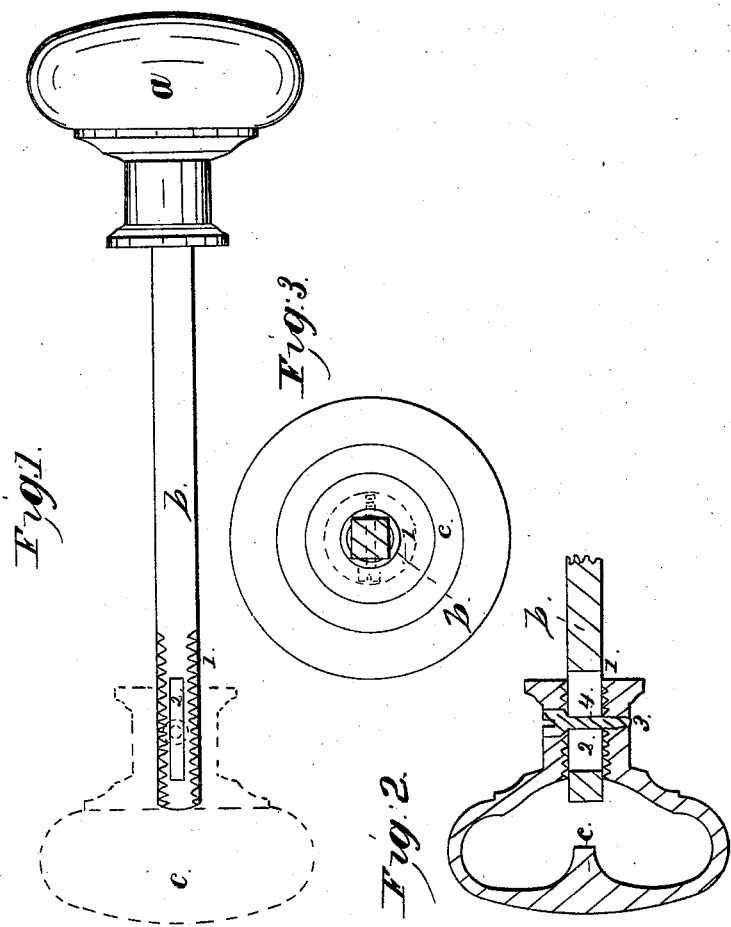

WILLIAM H. MACKRELL, OF NEW YORK, N. Y.

FASTENING DOOR-KNOBS.

Specification of Letters Patent No. 5,345, dated October 30, 1847.

*To all whom it may concern:*

Be it known that I, WILLIAM H. MACKRELL, of the city, county, and State of New York, locksmith, have invented and made and applied to use a certain new and useful improvement in the construction of lock-spindles, whereby attachment to handles or knobs is made firmer, with means of adjustment to the thickness of doors and escutcheons, for which improvements I seek Letters Patent of the United States, and that the said improvement and the mode of constructing and using the same are fully and substantially set forth and shown in the following specification and in the drawing annexed to and making a part of this specification, wherein—

Figure 1, represents an elevation of the spindles, and the fixed handle, or knob, in place, with the other or adjustable handle, or knob, shown by dotted lines; Fig. 2, is a sectional elevation, through the adjustable knob, at right angles to Fig. 1; Fig. 3, is a plan of the adjustable knob, at the collar end, and the same letters and numbers, as marks of reference, apply to the like parts, in all the several figures.

$a$, is the fixed knob, on one end of the spindle $b$, which has, at the other end a screw 1., cut on the angles of the spindle, or may be formed round, at this part. In this end of the spindle a mortise 2., is cut entirely through, and nearly the length of the screw thread; a knob $c$, is to be formed with a screw, cut on the inside of the collar and neck, to screw on to the spindle, with a hole through the neck, countersunk on one side, to take the screw head, and on the opposite side, a worm at 3., to receive and hold the small screw 4., which goes entirely through the neck of the knob, and through the mortise, in the spindle. When thus constructed, the knob $c$., is to be screwed on the spindle $b$., to the required point, and the screw 4., put through the hole in the neck of the knob, and through the mortise 2., in the spindle $b$., and screwed into the worm, in the hole, on the opposite side of the neck.

By this arrangement, it will be seen, that the knob $c$., can be adjusted to a half turn of the screw, on the spindle $b$., as the mortise 2., allows the screw 4., to enter from either side; and any power, applied to the handle, has not any leverage over the screw, as is the case, where a groove is used in the side of the spindle, to receive the point of a screw, through one side of the neck; and no jar, or strain, on the parts, can loosen the handle, unless sufficient to cut the screw 4., off at two points. When the screw 4., is removed the knob can be taken off the spindle by unscrewing it, or the knob may be screwed on tighter, as needed, the screw 4., on being replaced will hold all fast again. The sizes of the parts employed, are not important, as the same arrangement may be used, in the spindles and knobs of any size of locks, requiring to be fitted with such parts.

I do not claim to have invented set screws, or pins, for the purpose of preventing the handles of locks from turning on the spindle; but What I do claim as new, and of my own invention, and desire to secure by Letters Patent, is—

The constructing the screwed end of the spindle $b$., with a mortise or slot, to receive a screw, or pin 4., screwed or driven through the neck of the knob, and the mortise, so as to be supported at both ends, for the purpose of adjusting the knob in place, and preventing the handle from turning on the screw 1., substantially as described and shown.

In witness whereof I have hereunto set my hand in the city of New York this eighteenth day of May one thousand eight hundred and forty seven.

WILLIAM H. MACKRELL.

Witnesses:
W. SERRELL.
LEMUEL W. SERRELL.